United States Patent
Lee et al.

(10) Patent No.: US 11,076,228 B2
(45) Date of Patent: Jul. 27, 2021

(54) ELECTRONIC DEVICE INCLUDING ACTUATOR CONFIGURED TO OUTPUT SOUND AND METHOD FOR OPERATING SAME

(71) Applicant: Samsung Electronics Co., Ltd., Gyeonggi-do (KR)

(72) Inventors: Wookwang Lee, Gyeonggi-do (KR); Hyungjae Im, Gyeonggi-do (KR); Jeongho Kim, Gyeonggi-do (KR); Kyounghoon Kim, Gyeonggi-do (KR); Sungyong Bang, Gyeonggi-do (KR); Yonglae Cheong, Gyeonggi-do (KR)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 16/860,708

(22) Filed: Apr. 28, 2020

(65) Prior Publication Data
US 2020/0344547 A1  Oct. 29, 2020

(30) Foreign Application Priority Data

Apr. 29, 2019 (KR) .................. 10-2019-0049776

(51) Int. Cl.
  *H03G 11/00* (2006.01)
  *H04R 3/00* (2006.01)
  *H04M 1/60* (2006.01)
  *H04R 1/02* (2006.01)

(52) U.S. Cl.
  CPC .......... *H04R 3/007* (2013.01); *H04M 1/6016* (2013.01); *H04R 1/028* (2013.01); *H04R 2400/03* (2013.01); *H04R 2499/11* (2013.01); *H04R 2499/15* (2013.01)

(58) Field of Classification Search
  CPC ...... H04R 3/007; H04R 1/028; H04M 1/6016
  See application file for complete search history.

(56) References Cited

U.S. PATENT DOCUMENTS

| | | |
|---|---|---|
| 2004/0004908 A1 | 1/2004 | Watanabe |
| 2014/0112510 A1 | 4/2014 | Yang et al. |
| 2015/0271323 A1 | 9/2015 | Kim et al. |
| 2016/0028787 A1 | 1/2016 | Pare et al. |
| 2016/0118033 A1 | 4/2016 | Owen, Jr. et al. |

(Continued)

FOREIGN PATENT DOCUMENTS

| | | |
|---|---|---|
| JP | 2005-300668 | 10/2005 |
| KR | 1020140001516 | 1/2014 |

(Continued)

OTHER PUBLICATIONS

International Search Report dated Aug. 10, 2020 issued in counterpart application No. PCT/KR2020/005666, 7 pages.

*Primary Examiner* — Simon King
(74) *Attorney, Agent, or Firm* — The Farrell Law Firm, P.C.

(57) ABSTRACT

An electronic device is provided. The electronic device includes a display, an actuator configured to output at least one of a sound and a vibration by using the display, and a processor configured to identify whether the display is activated, identify the temperature of the electronic device if the display is activated, and control the actuator to generate at least one of a sound and a vibration at a designated frequency if the temperature is lower than a designated temperature.

20 Claims, 14 Drawing Sheets

(56) References Cited

U.S. PATENT DOCUMENTS

| | | | | |
|---|---|---|---|---|
| 2017/0094037 A1* | 3/2017 | Gaurav | ............... | H04M 1/6066 |
| 2018/0054503 A1* | 2/2018 | Park | ........................ | H04M 1/22 |
| 2019/0098395 A1 | 3/2019 | Keeling | | |
| 2020/0304618 A1* | 9/2020 | Seo | ............................ | G01J 3/46 |

FOREIGN PATENT DOCUMENTS

| KR | 1020150109074 | 10/2015 |
|---|---|---|
| KR | 1020170037279 | 4/2017 |
| KR | 1020180019278 | 2/2018 |

* cited by examiner

ELECTRONIC DEVICE INCLUDING ACTUATOR CONFIGURED TO OUTPUT SOUND AND METHOD FOR OPERATING SAME

CROSS-REFERENCE TO RELATED APPLICATION(S)

This application is based on and claims priority under 35 U.S.C. 119 to Korean Patent Application No. 10-2019-0049776, filed on Apr. 29, 2019, in the Korean Intellectual Property Office, the entire disclosure of which is incorporated herein by reference.

BACKGROUND

1. Field

The present disclosure relates generally to an electronic device including an actuator configured to output a sound and a method for operating the same.

2. Description of Related Art

Electronic devices such as smartphones or tablet PCs may perform various functions such as voice communication, video communication, wireless data communication, and media output. Electronic devices may execute various applications, and may output various sounds in connection with executing various applications.

A screen sound actuator (SSA) may refer to a device attached to the display of an electronic device (e.g., a smartphone or a terminal) such that the same can generate sounds and vibrations by using the display itself as a vibrating plate. Electronic devices such as smartphones or tablet PCs may substitute the SSAs for existing receivers (e.g., telephone receiving units). That is, it is advantageous for an electronic device (e.g., a smartphone) to employ an SSA in that, by replacing the receiver, the entire front portion thereof can be implemented as a display area, and the design thereof can be improved.

An SSA includes a ferrofluid therein, which is a liquid containing magnetic microparticles of iron oxide ($Fe_3O_4$). The ferrofluid may play the role of a bumper, which conducts a damping action when the vibrating plate of the SSA vibrates. If the ferrofluid is absent, vibration may not stop immediately despite control for stopping the same. As such, the ferrofluid is indispensable in designing the SSA.

Conventional electronic devices including the SSA have no consideration of temperature characteristics of the ferrofluid included inside the SSA. That is, conventional electronic devices are not configured for compensation and management according to the temperature characteristics of the liquid-type ferrofluid. If an electronic device remains at a low temperature in an area near the polar zone or during midwinter, the liquid-type ferrofluid may be partially frozen, thereby increasing the viscosity thereof, and reducing the sound pressure output through the SSA. This problem may commonly occur with all electronic devices employing an SSA

SUMMARY

The present disclosure has been made to address at least the disadvantages described above and to provide at least the advantages described below.

In accordance with an aspect of the present disclosure, an electronic device is provided. The electronic device includes a display, an actuator configured to output at least one of a sound and a vibration by using the display, and a processor configured to identify whether the display is activated, identify the temperature of the electronic device if the display is activated, and control the actuator to generate at least one of a sound and a vibration at a designated frequency if the temperature is lower than a designated temperature.

In accordance with an aspect of the present disclosure, a method for operating an electronic device is provided. The method includes identifying whether a display included in the electronic device is activated, identifying a temperature of the electronic device if the display is activated, and controlling an actuator included in the electronic device to generate at least one of a sound and a vibration at a designated frequency if the temperature is lower than a designated temperature. The actuator is configured to output at least one of the sound and the vibration by using the display as a vibrating plate.

In accordance with an aspect of the present disclosure, an electronic device is provided. The electronic device includes a display, an actuator configured to output at least one of a sound and a vibration by using the display, and a processor configured to identify a temperature of the electronic device, and control the actuator to generate at least one of a sound and a vibration at a designated frequency if the temperature is lower than a designated temperature.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Figure 1:
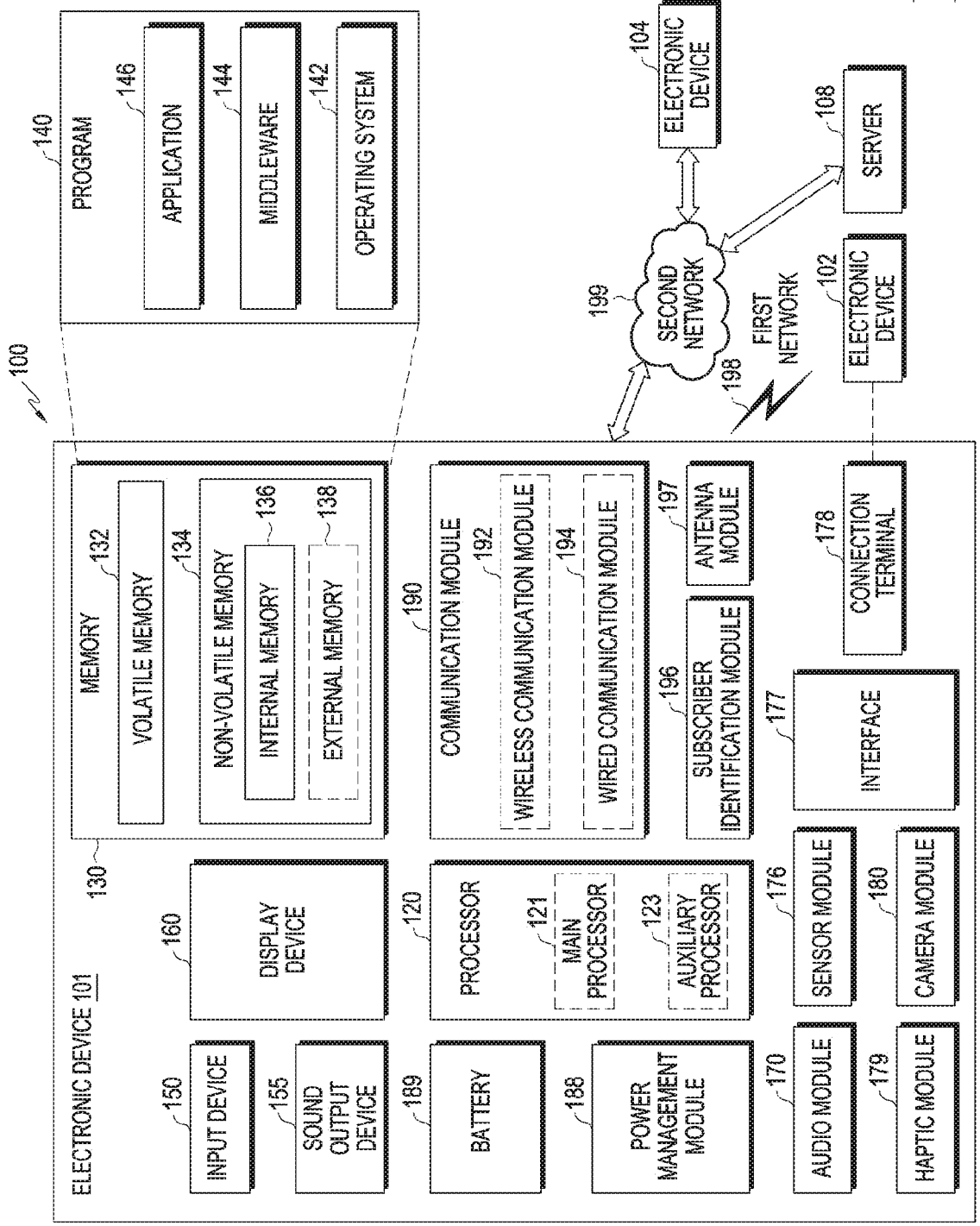
FIG. 1 is a block diagram of an electronic device inside a network environment, according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a speaker or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As used herein, the term "actuator" may refer to a device attached to the display of an electronic device (for example, smartphone or terminal) such that the same can generate sounds and vibrations by using the display itself of the electronic device as a vibrating plate. For example, the actuator may include a screen sound actuator (SSA).

Figure 2:
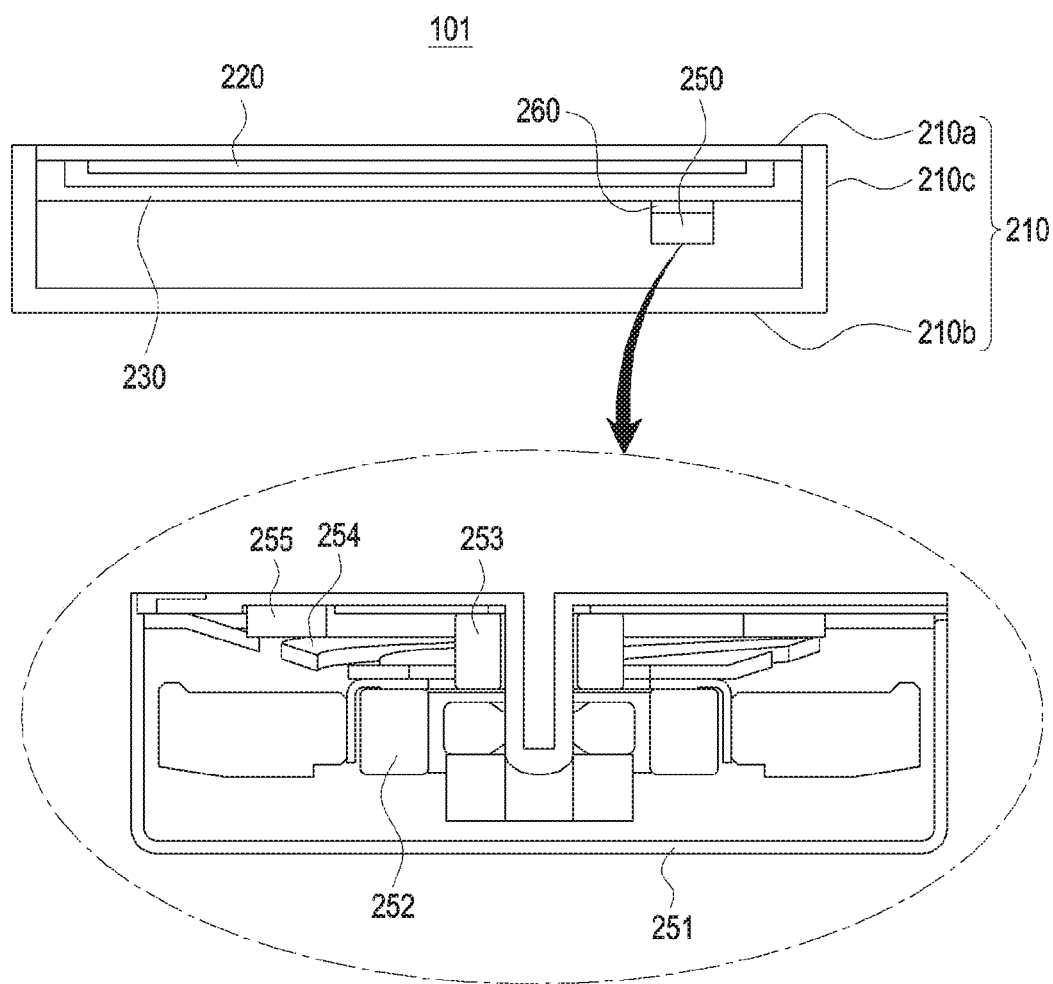
FIG. 2 is a diagram of an electronic device including a sound actuator together with a magnified view of the sound actuator, according to an embodiment.

FIG. 2 is a diagram of an electronic device including a sound actuator together with a magnified view of the sound actuator, according to an embodiment.

Referring to FIG. 2, the electronic device 101 may include a housing 210, a display assembly 220, a support member 230 (e.g., a bracket), and an actuator 250. At least one of the components of the electronic device 101 may be omitted, or the same may further include other components.

The housing 210 may include a first surface (or front surface) 210a, a second surface (or rear surface) 210b, and a side surface 210c surrounding the space between the first surface 210a and the second surface 210b. The housing may refer to a structure forming some of the first surface 210a, the second surface 210b, and the side surface 210c in FIG. 2. The first surface 210a may be formed by a front plate, at least a part of which is substantially transparent (e.g., polymer plate or glass plate including various coating layers). The second surface 210b may be formed by a substantially opaque rear plate. The rear plate may be formed by, for example, coated or colored glass, ceramic, a polymer, a metal (e.g., aluminum, stainless steel (STS), or magnesium), or a combination of at least two of the above materials. The side surface 210c may be formed by aside bezel structure which is coupled to the front plate and to the rear plate, and which includes a metal and/or a polymer. The rear plate and the side bezel structure may be formed integrally and may include the same material (e.g., metal material such as aluminum).

The display assembly 220 may be exposed through a corresponding portion of the front plate. At least a part of the display assembly 220 may be exposed through the first surface 210a, or at least a part of the display assembly 220 may be exposed through a front plate that forms the first surface 210a and an area of the side surface 210c.

The support member 230 may be disposed inside the electronic device 101 and connected to the side bezel structure, or may be formed integrally with the side bezel structure. The support member 230 may be made of a metal material and/or a nonmetal (for example, polymer) material. The display assembly 220 may be coupled to one surface of the support member 230, and a PCB may be coupled to the other surface thereof. A processor, a memory, and/or an interface may be mounted on the PCB. The processor may include one or more of a CPU, an AP, a GPU, an ISP, a sensor hub processor, or a CP, for example.

The actuator 250 may be disposed to face at least a part of the display assembly 220 with the support member 230 interposed therebetween. The actuator 250 may be disposed on one surface (e.g., a rear surface) of the support member 230, and may provide the function of a receiver and/or a vibrator, which can deliver sounds and vibrations through the front plate. The actuator 250 may be directly disposed on one surface (e.g., a rear surface) of the front plate.

The actuator 250 may be directly attached to the support member 230 or the front plate by an attachment member 260 (e.g., double-sided tape). The actuator 250 may be disposed adjacent to a heat-generating electronic component (e.g., the AP). The actuator 250 may be configured such that latent heat generated when the AP is driven can be delivered to the actuator 250, thereby maintaining a predetermined temperature or higher in a specific situation (e.g., low-temperature state equal to or below a designated level).

The actuator 250 may include a body portion 251, a magnet 252, a coil 253, an elastic member 254, and a magnetic material 255. The body portion 251 may provide a space in which components can be mounted. The magnet 252 and the coil 253 may generate sounds by using the front plate as a vibrating plate. The magnetic material 255 may be a ferrofluid including a liquid containing magnetic microparticles of iron oxide ($Fe_3O_4$), for example. The ferrofluid may play the role of a bumper when the vibrating plate of the actuator 250 vibrates. In general, when the actuator 250 maintains a low-temperature state at a predetermined level or higher, the viscosity of the magnetic material 255 may increase, thereby decreasing the sound pressure, and decreasing the amount of sound. Hereinafter, a method capable of maintaining the sound pressure, regardless of temperature drop, will be described.

Figure 3:
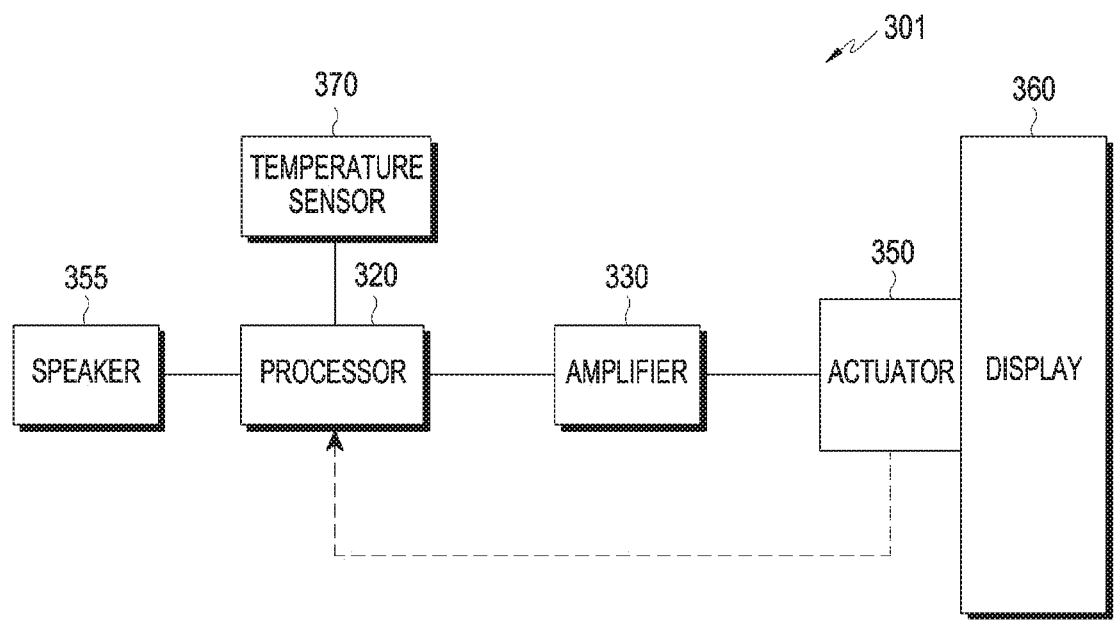
FIG. 3 is a block diagram of an electronic device, according to an embodiment.

FIG. 3 is a diagram of an electronic device, according to an embodiment.

Referring to FIG. 3, the electronic device 301 may include a processor 320, an amplifier 330, an actuator 350, a speaker 355, a display 360, and a temperature sensor 370.

The electronic device 301 may be implemented substantially identically or similarly to the electronic device 101 in FIG. 1. The electronic device 301 may include no receiver protruding from the front portion thereof.

The processor 320 may control the overall operation of the electronic device 301. The processor 320 may be implemented substantially identically or similarly to the processor 120 in FIG. 1.

The processor 320 may vibrate the actuator 350, if the actuator 350 maintains a low-temperature state at a predetermined level or higher, such that the viscosity of the magnetic material included in the actuator 350 decreases. If the actuator 350 maintains a sub-zero temperature state, the processor 320 may vibrate the actuator 350 such that the viscosity of the magnetic material included in the actuator 350 decreases. This enables the processor 320 to prevent the sound pressure output through the actuator 350 from decreasing or the amount of sound from decreasing, even if the actuator 350 maintains a low-temperature state at a predetermined level or higher.

The processor 320 may identify the temperature of the electronic device 301 by using a temperature sensor 370 (e.g., sensor module 176 in FIG. 1). The processor 320 may compare the temperature of the electronic device 301 with a designated temperature. The designated temperature may serve as a reference regarding a state in which the actuator 350 can normally output vibrations or sounds, and may be automatically determined by the processor 320 or determined by the user.

The processor 320 may control the actuator 350 to generate at least one of a sound and a vibration at a predetermined frequency, if the identified temperature is lower than the designated temperature. The processor 320 may control the actuator 350 to generate a vibration at a designated frequency for a designated period of time. The designated frequency may refer to a frequency at which the user cannot recognize or feel vibrations, and the designated time may refer to a time during which the actuator 350, if vibrating at the designated frequency, can reach such a state that the same can normally output vibrations or sounds. The designated frequency and the designated time may be automatically determined by the processor 320 or determined by the user. The processor 320 may control the actuator 350 to generate vibrations at 15-20 Hz for 5-10 seconds.

The processor 320 may control the actuator 350 to output sounds at the designated frequency if the identified temperature is lower than the designated temperature. The processor 320 may control the actuator 350 to generate a sound at a designated frequency for a designated period of time. The designated frequency may refer to a frequency at which the user cannot recognize or feel sounds (e.g., frequency outside the audible frequency range), and the designated time may refer to a time during which the actuator 350, when outputting sounds at the designated frequency, can reach such a state that the same can normally output vibrations or sounds. The designated frequency and the designated time may be automatically determined by the processor 320 or determined by the user. The processor 320 may control the actuator 350 to generate sounds at 16-20 Hz or lower or at 20 kHz or higher for 5-10 seconds.

The operation of the actuator 350 outputting vibrations or sounds at a designated frequency when the temperature of the electronic device 301 is lower than a designated temperature, as described above, will herein be defined as pre-aging or a pre-aging operation. By performing the pre-aging operation, the actuator 350 may lower the viscosity of the ferrofluid in a low-temperature state. That is, the processor 320 may normalize the viscosity of the ferrofluid included in the actuator 350 in a low-temperature state, through pre-aging of the actuator 350. This enables the electronic device 301 to recover the amount of sound output through the actuator 350 and to provide the user with sounds at an amount comparable to that at room temperature.

If the electronic device 301 starts a specific function in response to the user's input or a signal received from the outside, the processor 320 may identify the temperature of the electronic device 301. The electronic device 301 may perform a pre-aging operation according to the identified temperature. If the display 350 is activated (e.g., if the display is turned on) in response to the user's input or a signal received from the outside, the processor 320 may identify the temperature of the electronic device 301 by using a temperature sensor 370. If the temperature is lower than a designated temperature, the processor 320 may perform a pre-aging operation of the actuator 350.

The processor 320 may output a control signal for controlling the actuator 350. The processor 320 may output a control signal such that the actuator 350 outputs at least one of a vibration and a sound. In addition, the processor 320 may output a control signal to the actuator 350 through the amplifier 330.

The amplifier 330 may amplify a signal transmitted from the processor 320 to the actuator 350, and may output the amplified signal to the actuator 350.

If it is determined that a pre-aging operation is necessary, the processor 320 may acquire information regarding a waveform (or vibration waveform) having a designated frequency. The processor 320 may activate the amplifier 330 and may output a control signal for outputting a vibration corresponding to a waveform having a designated frequency to the actuator 350 through the amplifier 330.

The actuator 350 may output at least one of a sound and a vibration by using the display 360, under the control of the processor 320. The actuator 350 may perform the same function as that of the receiver of the sound output device 155 in FIG. 1. The actuator 350 may be implemented to contact the display 360 (or contact the inside of the display 360). The actuator 350 may output at least one of a sound and a vibration by using the display 360 as a vibrating plate. In addition, the actuator 350 may be disposed near the processor 320. The actuator 350 may be implemented substantially identically or similarly to the sound actuator in FIG. 2.

The actuator 350 may output vibrations at a designated frequency until a designated time expires. That is, the actuator 350 may stop outputting vibrations having the designated frequency if the designated time expires. Alternatively, the actuator 350 may stop outputting vibrations having the designated frequency upon detecting a command requesting a different vibration, even before the designated time expires. Then, the actuator 350 may output a vibration corresponding to the command requesting a different vibration.

The actuator 350 may independently identify the state of the actuator 350 regardless of control of the processor 320. The actuator 350 may identify the temperature of the actuator 350 and may identify the state of the actuator 350, based on the identified temperature. In addition, the actuator 350 may provide the processor 320 with feedback indicating the state of the actuator 350. If it is identified that the sound pressure has decreased at the current temperature (e.g., if the output sound pressure has decreased due to the low temperature), the actuator 350 may independently perform a pre-aging operation. The actuator 350 may inform, through an interrupt, the processor 320 that a pre-aging operation is being performed.

The speaker 355 may output sounds under the control of the processor 320. The speaker 355 may be implemented substantially identically or similarly to the speaker of the sound output device 155 in FIG. 1.

The processor 320 may change the sound (or voice) output path from the actuator 350 to the speaker 355 or vice versa. If it is determined that the actuator 350 cannot normally output sounds in the current state, the processor 320 may output sounds through the speaker 355. Alternatively, the processor 320 may output sounds through the speaker 355 until the pre-aging operation of the actuator 350 is finished.

The display 360 may display information of the electronic device 301. The inside of the display 360 may contact the actuator 350. As the display 360 vibrates, at least one of a sound and a vibration may be output.

Operations of the electronic device 301 described below may be performed under the control of the processor 320, unless specified otherwise.

Figure 4:
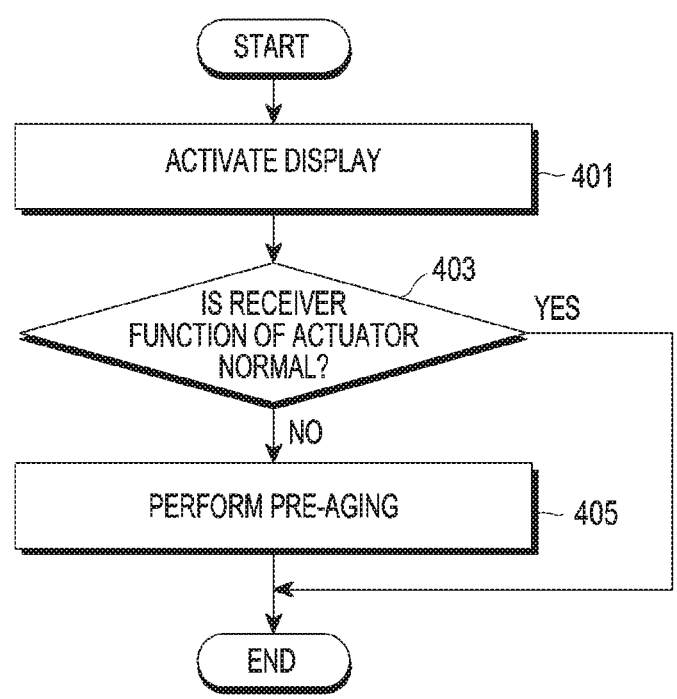
FIG. 4 is a flowchart of steps of an electronic device controlling an actuator, according to an embodiment.

FIG. 4 is a flowchart of steps of an electronic device controlling an actuator, according to an embodiment.

Referring to FIG. 4, the electronic device 301 may identify whether or not to activate the display 360.

At step 401, the display 360 of the electronic device 301 may be activated. Activation of the display 360 may mean that the display 360 is turned on. The display 360 may be activated when the electronic device 301 performs or starts a specific operation or a specific function. The display 360 may be activated when the electronic device 301 receives a call or originates a call. Alternatively, the display 360 may be activated when the electronic device 301 receives an input from the user.

At step 403, the electronic device 301 may identify whether the receiver function of the actuator 350 can operate normally. The electronic device 301 may identify, if the display 360 is activated, whether or not the receiver function of the actuator 350 can operate normally. A normal state of the receiver function may mean that the amount of sound output by the actuator 350 is sufficient for normal telephone speech. The electronic device 301 may identify whether or not the receiver function of the actuator 350 can operate normally, based on a temperature identified through the temperature sensor 370. The electronic device 301 may determine that the receiver function can operate normally if the temperature identified through the temperature sensor 370 is equal to or higher than a designated temperature.

At step 405, the electronic device 301 may perform a pre-aging operation of the actuator 350 if it is identified that the receiver function of the actuator 350 does not operate normally (No in 403). The electronic device 301 may identify that the receiver function can operate normally, if the pre-aging operation is completely performed. On the other hand, if it is identified that the receiver function of the actuator 350 can operate normally (Yes in 403), the electronic device 301 may not perform the pre-aging operation.

The electronic device 301 may identify whether or not the receiver function of the actuator 350 can operate normally, regardless of whether or not the display 360 is activated. The electronic device 301 may identify whether or not the receiver function of the actuator 350 can operate normally, periodically or aperiodically. If it identified that the receiver function of the actuator 350 does not operate normally, the electronic device 301 may perform a pre-aging operation of the actuator 350. Alternatively, if it is identified that the receiver function of the actuator 350 can operate normally, the electronic device 301 may not perform the pre-aging operation.

Figure 5A:
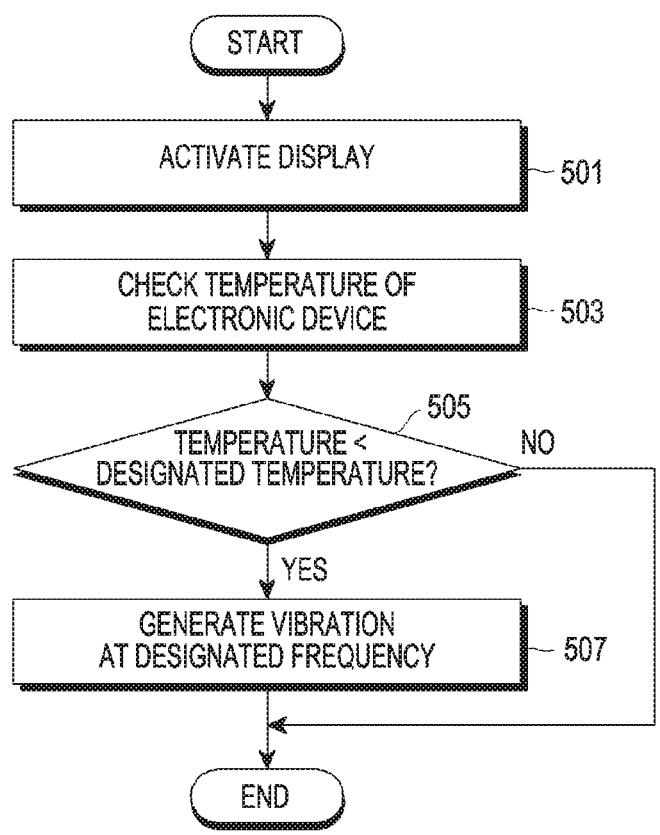
FIG. 5A is a flowchart of steps of an electronic device controlling an actuator, according to an embodiment.
Figure 5B:
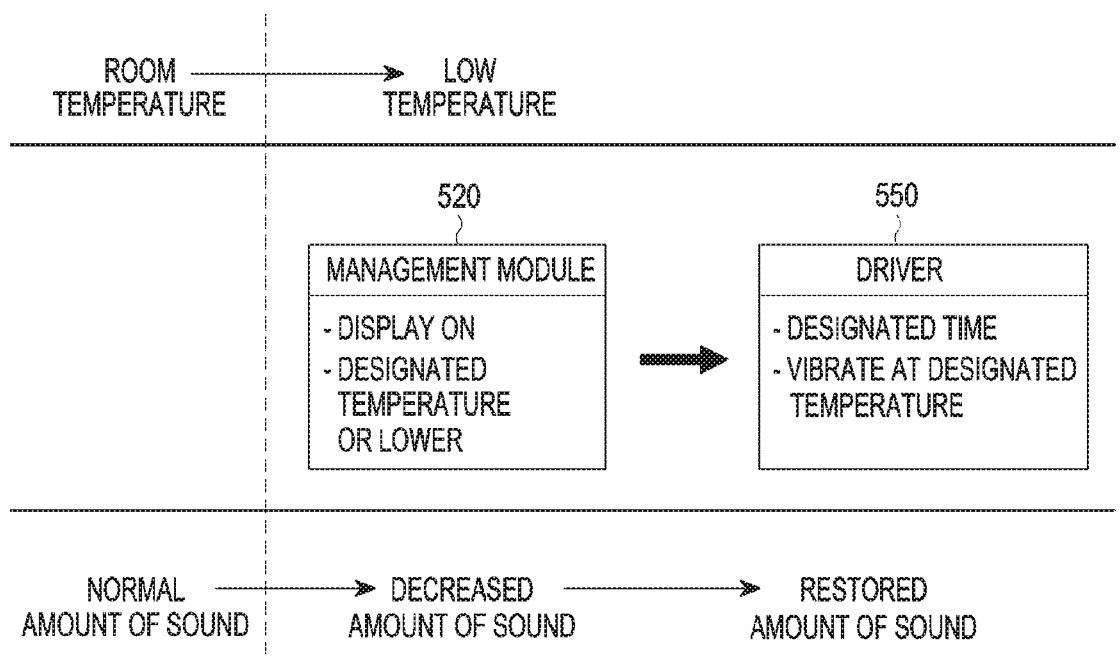
FIG. 5B is a diagram of steps of an electronic device controlling an actuator, according to an embodiment.

FIG. 5A is a flowchart of steps of an electronic device controlling an actuator, according to an embodiment. FIG. 5B is a diagram of steps of an electronic device controlling an actuator, according to an embodiment.

Referring to FIG. 5A, at step 501, the display 360 of the electronic device 301 may be activated.

At step 503, if the display 360 is activated, the electronic device 301 may identify the temperature of the electronic device 301 by using the temperature sensor 370.

Referring to FIG. 5B, the management module 520 executed by the processor 320 may identify whether or not the display 360 is activated, and may identify the current temperature of the electronic device 301. The management module 520 may refer to a program or a module configured to manage the state of the electronic device 301.

At step 505, the electronic device 301 may compare the identified current temperature of the electronic device 301 with a designated temperature. The electronic device 301 may identify whether or not the current temperature is lower than the designated temperature.

The management module 520 may acquire a designated temperature value stored in the memory 130 and may compare the same with the current temperature. In addition, the management module 520 may identify whether or not the current temperature is lower than the designated temperature. If the current temperature is lower than the designated temperature, the management module 520 may determine that the amount of sound output through the actuator 350 decreases.

At step 507, if the current temperature of the electronic device 301 is lower than the designated temperature, the electronic device 301 may control the actuator 350 to generate vibrations at a predetermined frequency (e.g., 15-20 Hz) for a predesignated time (e.g., 5-seconds). Accordingly, the actuator 350 may generate vibrations at a predetermined frequency (e.g., 15-20 Hz) for a predesignated time (e.g., 5-10 seconds). The actuator 350 may generate vibrations to such an extent that the user cannot feel the same. On the other hand, if the current temperature of the electronic device 301 is not lower than the designated temperature, the electronic device 301 may not generate vibrations at the designated frequency through the actuator 350.

The management module 520 may transmit a command for instructing the actuator 350 to generate vibrations at a designated frequency to the driver 550 for a predesignated time. The management module 520 may transmit the command to the driver 550 through a designated node. The driver 550 may refer to a driver configured to control the actuator 350 (or controls vibration of the actuator 350). The actuator 350 may generate vibrations at 15-20 Hz for 5-10 seconds under the control of the driver 550. Accordingly, the management module 520 may determine that the amount of sound output through the actuator 350 returns to the normal state.

The electronic device 301 may control the actuator 350 to generate vibrations at a designated frequency, which cannot be felt by the user, for a predesignated time such that the amount of sound output through the actuator 350 can be restored to the normal state at any external temperature (for example, a low-temperature state). In addition, the electronic device 301 may identify the temperature as soon as the display 360 is activated, thereby restoring the actuator 350 to the normal state, such that the user has no inconvenience in outputting sounds through the actuator 350.

Figure 6A:
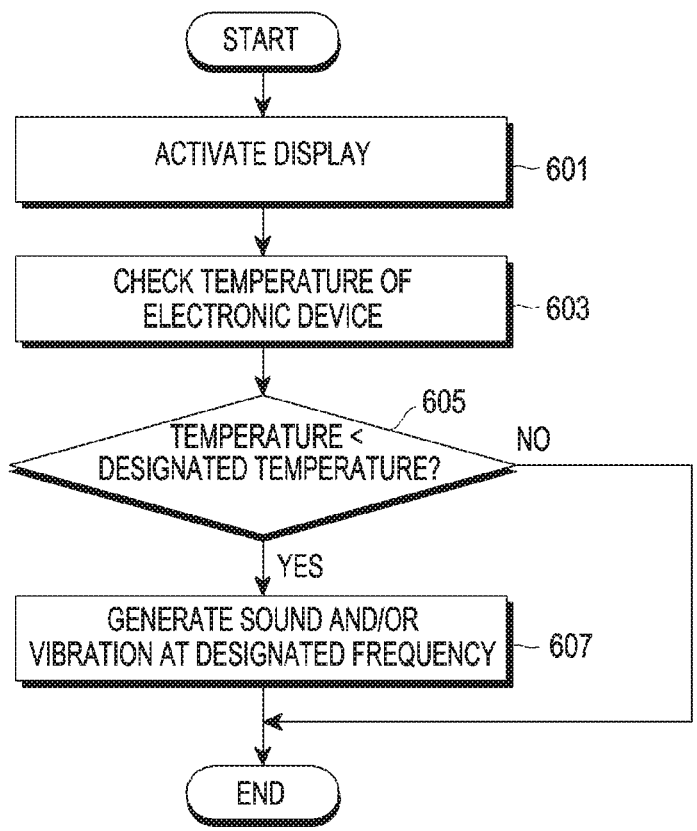
FIG. 6A is a flowchart of steps of an electronic device controlling an actuator, according to an embodiment.
Figure 6B:
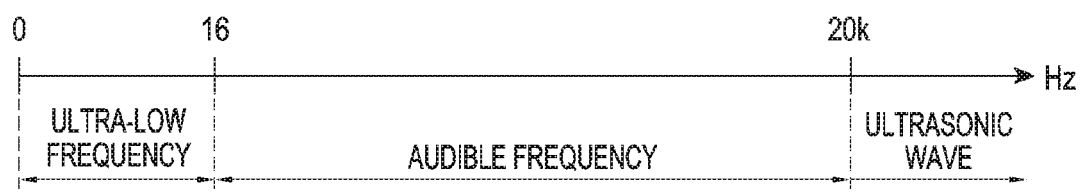
FIG. 6B is a diagram of steps of an electronic device controlling an actuator, according to an embodiment.

FIG. 6A is a flowchart of steps of an electronic device controlling an actuator, according to an embodiment. FIG. 6B is a diagram of steps of an electronic device controlling an actuator, according to an embodiment.

Referring to FIG. 6A, at step 601, the display 360 of the electronic device 301 may be activated.

At step 603, if the display 360 is activated, the electronic device 301 may identify the temperature of the electronic device 301 by using the temperature sensor 370.

At step 605, the electronic device 301 may compare the identified current temperature of the electronic device 301 with a designated temperature. The electronic device 301 may identify whether or not the current temperature is lower than the designated temperature.

At step 607, if the current temperature of the electronic device 301 is lower than the designated temperature, the electronic device 301 may control the actuator 350 to generate sounds at a predetermined frequency (frequency outside the human audible frequency range, such as an ultra-low frequency or a supersonic frequency) for a predesignated time. The actuator 350 may generate sounds and/or vibrations at a predetermined frequency (e.g., 10 Hz) for a predesignated time (e.g., 10 seconds). The actuator 350 may generate sounds and vibrations to such an extent that the user cannot feel the same. On the other hand, if the current temperature of the electronic device 301 is not lower than the designated temperature, the electronic device 301 may not generate sounds and/or vibrations at a designated frequency through the actuator 350.

The electronic device 301 may control the actuator 350 to generate sounds and/or vibrations at a designated frequency, which cannot be felt by the user, for a predesignated time such that the amount of sound (or sound pressure) output through the actuator 350 can be restored to the normal state at any external temperature (for example, low-temperature state).

Figure 7:
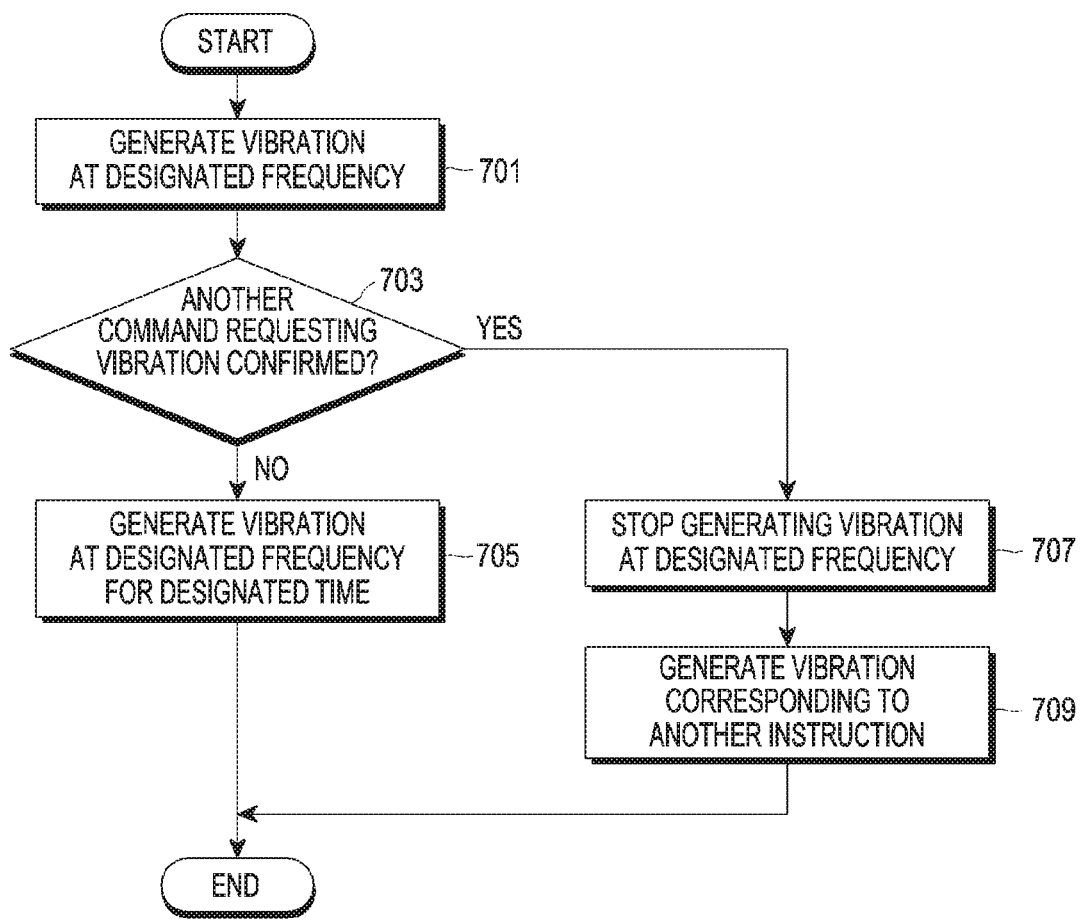
FIG. 7 is a flowchart of steps of an electronic device controlling an actuator, according to an embodiment.

FIG. 7 is a flowchart of steps of an electronic device controlling an actuator, according to an embodiment.

Referring to FIG. 7, at step 701, the electronic device 301 may control the actuator 350 to generate vibrations at a designated frequency. That is, the electronic device 301 may subject the actuator 350 to pre-aging.

At step 703, the electronic device 301 may identify another command requesting vibration of the actuator 350. The electronic device 301 may identify whether or not there is a command requesting vibration by means of call reception. Alternatively, the electronic device 301 may identify whether or not there is a command requesting vibration by means of an alarm.

At step 705, if no other command requesting vibration of the actuator 350 is identified, the electronic device 301 may control the actuator 350 to generate vibrations at a designated frequency for a designated time.

At step 707, if another command requesting vibration of the actuator 350 is identified, the electronic device 301 may control the actuator 350 to stop generating vibrations at the designated frequency.

At step 709, the electronic device 301 may control the actuator 350 to generate vibrations corresponding to the other identified command. If vibration is requested by means of call reception or alarm, the electronic device 301 may control the actuator 350 to generate vibrations that the user can feel, in response to the call reception or alarm. That is, an actually reproduced vibration also has the effect of a kind of pre-aging operation. Accordingly, upon identifying a command for generating vibrations that the user can feel while the actuator 350 performs a pre-aging operation, the electronic device 301 may generate vibrations corresponding to the vibration pattern to be reproduced actually.

Figure 8A:
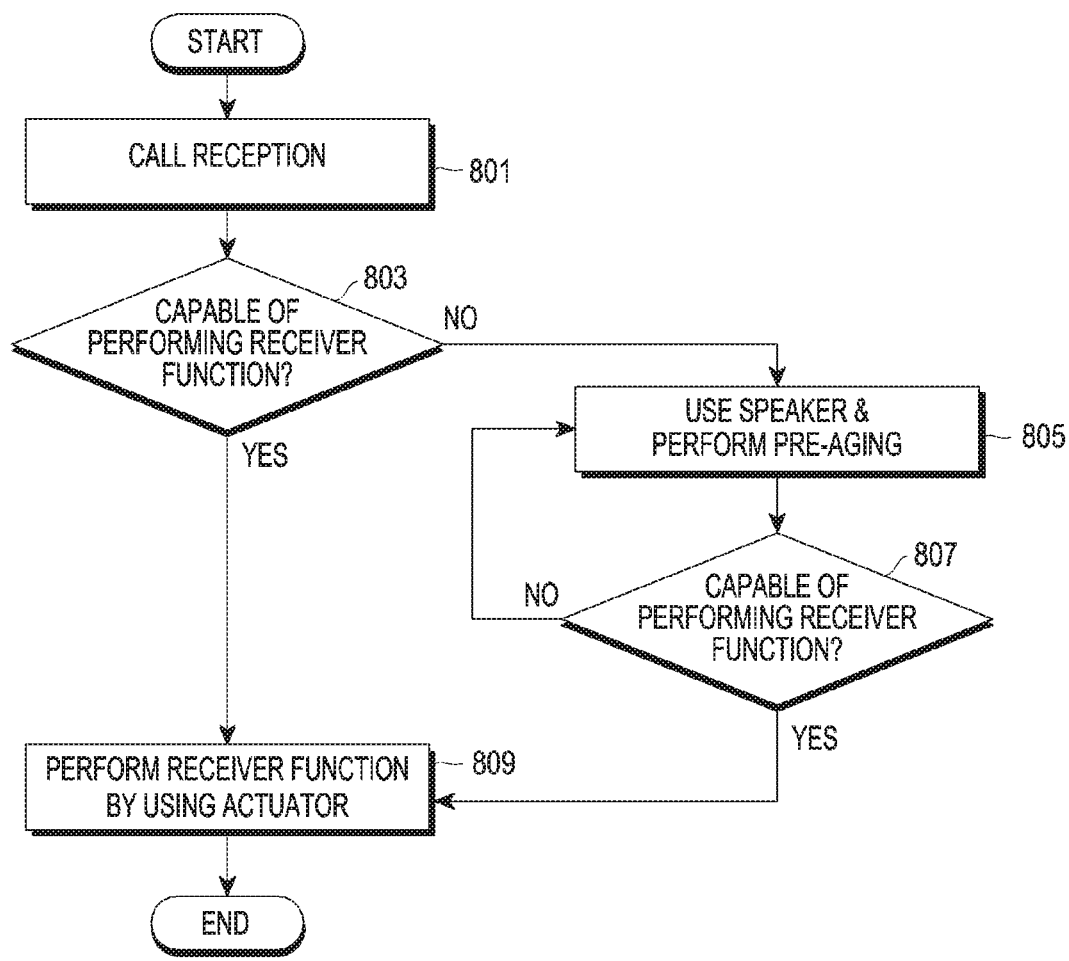
FIG. 8A is a flowchart of an electronic device operating method when an actuator cannot normally perform a receiver function, according to an embodiment.

FIG. 8A is a flowchart of an electronic device operating method when an actuator cannot normally perform a receiver function, according to an embodiment.

Referring to FIG. 8A, at step 801, the electronic device 301 may identify call reception. The electronic device 301 may activate the display 360 if call reception is identified.

At step 803, the electronic device 301 may identify whether or not the actuator 350 can perform a receiver function in the current state. The electronic device 301 may identify whether or not the actuator 350 can perform a receiver function in the current state, based on a temperature of the electronic device 301 identified through the temperature sensor 370. If the identified temperature is not lower than the designated temperature, the electronic device 301 may identify that the actuator 350 can perform a receiver function in the current state. Alternatively, if the identified temperature is lower than the designated temperature, the electronic device 301 may identify that the actuator 350 cannot perform a receiver function in the current state.

At step 809, if it is identified that the actuator 350 can perform a receiver function (Yes in 803), the electronic device 301 may perform a call-reception receiver function by using the actuator 350. That is, the electronic device 301 may vibrate the actuator 350 to output a call-reception voice.

At step 805, if it is identified that the actuator 350 cannot perform a receiver function (No in 803), the electronic device 301 may perform a call-reception receiver function by using the speaker 355. The electronic device 301 may use the speaker 355 to output an amount of sound comparable to that during telephone speech through a receiver, thereby performing a telephone speech function. Alternatively, the electronic device 301 may use the speaker 355 to perform a call reception-related telephone speech function in a speakerphone mode. In addition, the electronic device 301 may perform a pre-aging operation with regard to the actuator 350.

At step 807, the electronic device 301 may identify whether or not the actuator 350 can perform the receiver function in the current state, while performing the call-reception receiver function by using the speaker 355. The electronic device 301 may identify whether or not the actuator 350 can perform a receiver function in the current state, based on whether or not the actuator 350 has performed a pre-aging operation for a designated time. The electronic device 301 may determine that the actuator 350 can perform the receiver function in the current state if the actuator 350 has generated vibrations at the designated frequency for the designated time. That is, the electronic device 301 may determine that the actuator 350 can perform the receiver function in the current state if a designated time has passed since the actuator 350 started vibrating at the designated frequency.

At step 809, if it is identified that the actuator 350 can perform the receiver function in the current state (Yes in 807), the electronic device 301 may control the actuator 350 to perform the receiver function. Alternatively, the electronic device 301 may continuously control the speaker 355 to perform the receiver function. The device that performs the receiver function may be selected between the actuator 350 and the speaker 355 according to the user's selection or a predetermined condition. On the other hand, if the designated time has not passed since the actuator 350 started vibrating at the designated frequency, the electronic device 301 may continuously control the speaker 355 to perform the receiver function.

Figure 8B:
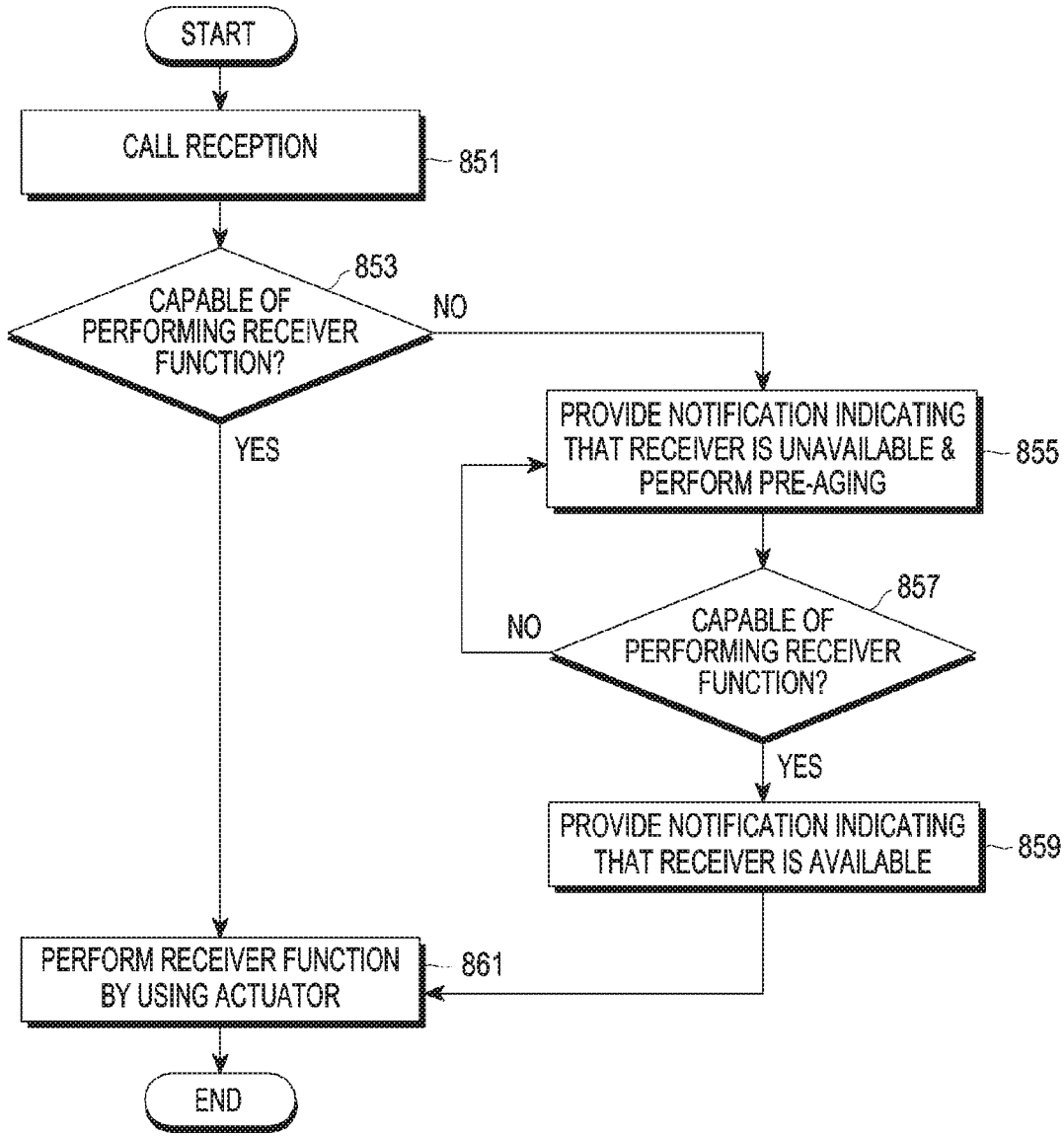
FIG. 8B is a flowchart of an electronic device operating method when an actuator cannot normally perform a receiver function, according to an embodiment.

FIG. 8B is a flowchart of an electronic device operating method when an actuator cannot normally perform a receiver function, according to an embodiment.

Referring to FIG. 8B, at step 851, the electronic device 301 may identify call reception. The electronic device 301 may activate the display 360 if call reception is identified.

At step 853, the electronic device 301 may identify whether or not the actuator 350 can perform a receiver function in the current state. The electronic device 301 may identify whether or not the actuator 350 can perform the receiver function in the current state, based on the temperature of the electronic device 301 identified through the temperature sensor 370, as at step 803 in FIG. 8A.

At step 861, if it is identified that the actuator 350 can perform a receiver function (Yes in 853), the electronic device 301 may perform a call-reception receiver function by using the actuator 350. That is, the electronic device 301 may vibrate the actuator 350 to output a call-reception voice.

At step 855, if it is identified that the actuator 350 cannot perform the receiver function (No in 853), the electronic device 301 may provide the user with a notification indicating that the receiver function is unavailable. The electronic device 301 may display, through the display 360, a message or a notification indicating that the receiver function is unavailable. In addition, the electronic device 301 may display, through the display 360, a message requesting standby (for example, call reception standby, or call reception impossible) for a designated time. Together therewith, the electronic device 301 may perform a pre-aging operation with regard to the actuator 350.

At step 857, the electronic device 301 may identify whether or not the actuator 350 can perform the receiver function in the current state, while displaying the notification or the message through the display 360. The electronic device 301 may determine that the actuator 350 can perform the receiver function in the current state if a designated time has passed since the actuator 350 started vibrating at the designated frequency.

At step 859, if it is identified that the actuator 350 can perform the receiver function in the current state (Yes in 857), the electronic device 301 may provide a message or a notification notifying that the receiver function is available, through the display 360. In addition, the electronic device 301 may display a message requesting telephone speech connection regarding the call reception.

At step 861, the electronic device 301 may control the actuator 350 to perform the receiver function if the telephone speech regarding the call reception is connected.

The above-described embodiment in FIG. 8A may be applied to a case in which the electronic device 301 has a separate speaker. On the other hand, the above-described embodiment in FIG. 8B may be applied to a case in which the electronic device 301 has no separate speaker. However, the embodiments are not necessarily applied to the above-mentioned situation.

Figure 9:
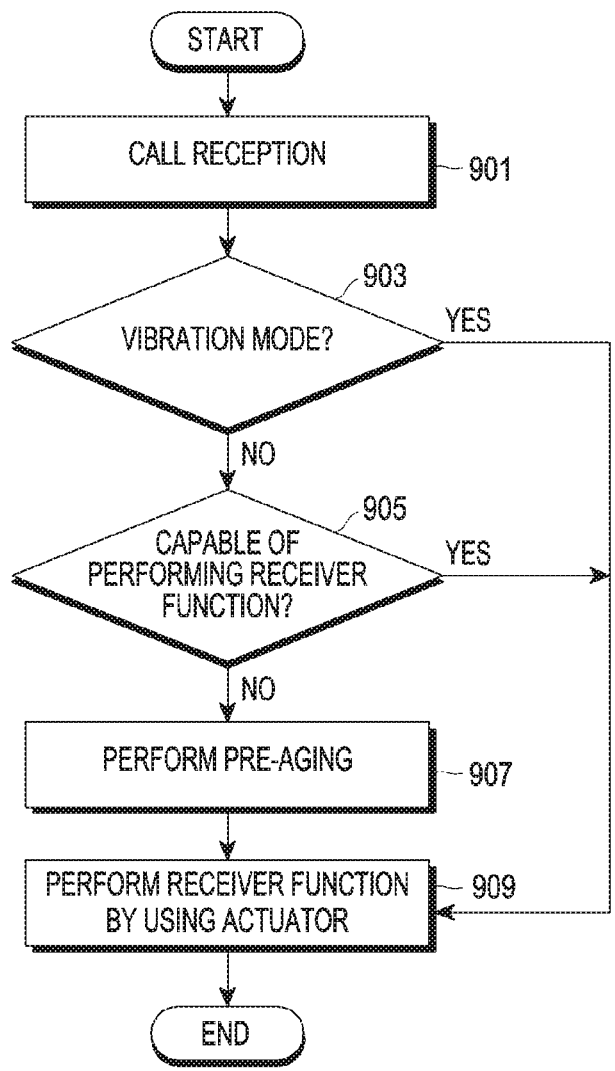
FIG. 9 is a flowchart of an electronic device operating method when call reception has occurred in a vibration mode of the electronic device, according to an embodiment.

FIG. 9 is a flowchart of an electronic device operating method when call reception has occurred in a vibration mode of the electronic device, according to an embodiment.

Referring to FIG. 9, at step 901, the electronic device 301 may identify call reception. If call reception is identified, the electronic device 301 may activate the display 360.

At step 903, the electronic device 301 may identify whether or not the electronic device 301 is configured in a vibration mode in which the same delivers a notification regarding call reception to the user through a vibration.

At step 909, if the electronic device 301 is configured in the vibration mode (Yes in 903), the electronic device 301 may control the actuator 350 to perform a receiver function, without performing a pre-aging operation of the actuator 350. That is, the actuator 350 generates a vibration corresponding to call reception in the vibration mode, and thus can normally perform a receiver function even without performing a separate pre-aging operation.

At step 905, if the electronic device 301 is not configured in the vibration mode (No in 903), the electronic device 301 may identify whether or not the actuator 350 can perform the receiver function in the current state. The electronic device 301 may compare the temperature of the electronic device 301 identified through the temperature sensor 370 with a designated temperature, thereby identifying whether or not the actuator 350 can perform the receiver function in the current state.

At step 909, if it is identified that the actuator 350 can perform the receiver function (Yes in 905), the electronic device 301 may perform a call-reception receiver function by using the actuator 350. That is, the electronic device 301 may vibrate the actuator 350 to output a call-reception voice.

At step 907, if it is identified that the actuator 350 cannot perform the receiver function (No in 905), the electronic device 301 may perform a pre-aging operation with regard to the actuator 350.

Step 905 may be omitted. If the electronic device 301 is not configured in the vibration mode (No in 903), the electronic device 301 may control the actuator 350 to perform a pre-aging operation without identifying whether or not the actuator 350 can perform the receiver function.

At step 909, the electronic device 301 may perform the receiver function by using the actuator 350 after the actuator 350 has performed the pre-aging operation.

Even if the electronic device 301 is configured in the vibration mode, the electronic device 301 may perform the pre-aging operation of the actuator 350. The electronic device 301 may perform the pre-aging operation of the actuator 350 when the actuator 350 cannot normally output a sound (or voice) even if a vibration corresponding to call reception has occurred. As described with reference to FIG. 8A, the electronic device 301 may perform the pre-aging operation of the actuator 350 while outputting a voice regrading call reception by using the speaker 355.

Figure 10:
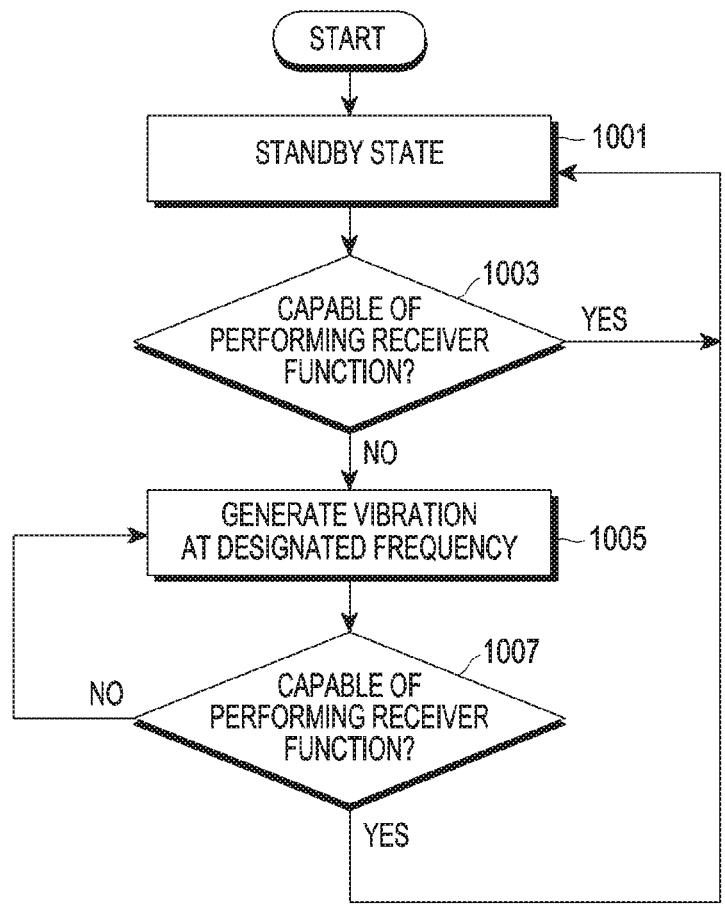
FIG. 10 is a flowchart of a method for performing a pre-aging operation independently by an actuator according to various embodiments.

FIG. 10 is a flowchart of a method for performing a pre-aging operation independently by an actuator according to various embodiments.

Referring to FIG. 10, the actuator 350 may identify whether or not a vibration is normally generated independently. That is, the actuator 350 may identify whether or not a vibration is normally generated independently by the actuator 350, with no control of the processor, and may perform a pre-aging operation according to the result of identification. The actuator 350 may implement a control logic therein, thereby performing the above step.

The actuator 350 may implement a control logic therein, thereby performing the following steps.

At step 1001, the actuator 350 may identify (or monitor), in a standby state (or idle state), whether or not vibrations can be normally generated periodically or aperiodically. The standby state may refer to a state in which the actuator 350 outputs no vibrations (and/or sounds).

At step 1003, the actuator 350 may identify whether or not the receiver function can be normally performed. The actuator 350 may identify the temperature of the actuator 350 by using a temperature sensor included in the control logic therein (or the temperature sensor 370 of the electronic device 301), and may identify (or determine) whether or not the receive function can be normally performed, based on the identified temperature.

At step 1005, the actuator 350 may generate vibrations at a designated frequency for a designated time. If it is identified that the receiver function cannot be normally performed, the actuator 350 may generate vibrations at a designated frequency for a designated time. The vibrations at the designated frequency may refer to a level of vibrations that the user cannot feel. That is, the actuator 350 may perform the above-mentioned pre-aging operation. In this case, the actuator 350 may output an interrupt to the processor 320 to inform that the pre-aging operation is performed. Alternatively, the actuator 350 may output an interrupt to the processor 320 to inform that vibrations have been generated at the designated frequency.

At step 1007, the actuator 350 may identify whether or not the receiver function can be normally performed. If the receiver function cannot be normally performed (No in 1007), the actuator 350 may perform the pre-aging operation again. On the other hand, if the receiver function can be normally performed (Yes in 1007), the actuator 350 may enter a standby state (or idle state).

Figure 11A:
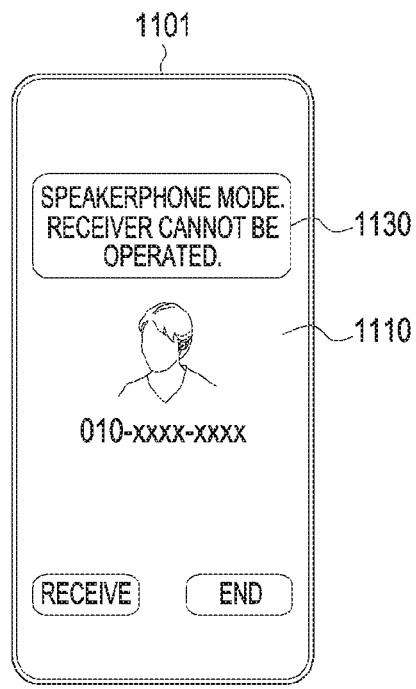
FIG. 11A is a diagram of a user interface provided by an electronic device, according to an embodiment.
Figure 11B:
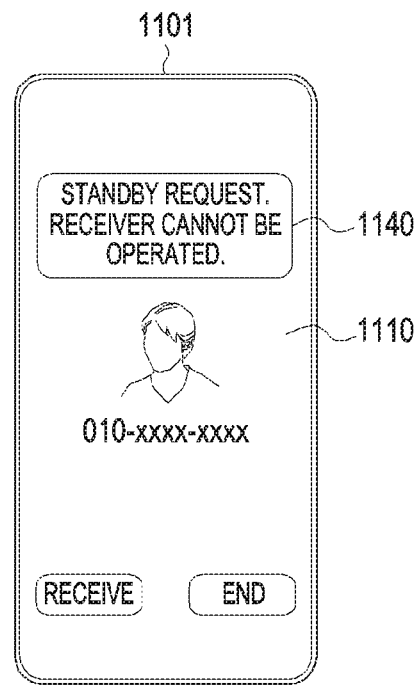
FIG. 11B is a diagram of a user interface provided by an electronic device, according to an embodiment.
Figure 11C:
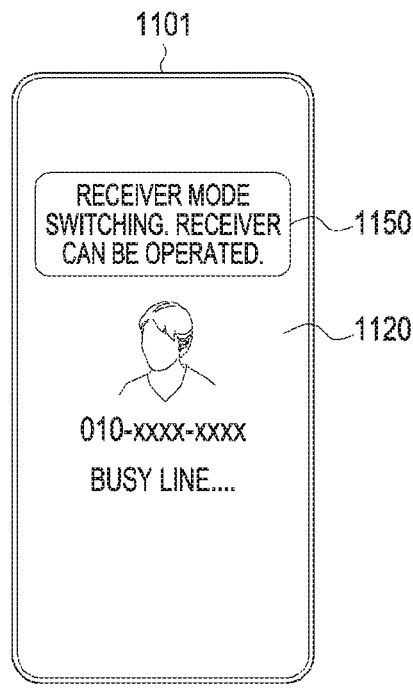
FIG. 11C is a diagram of a user interface provided by an electronic device, according to an embodiment.

FIG. 11A is a diagram of a user interface provided by an electronic device, according to an embodiment. FIG. 11B is a diagram of a user interface provided by an electronic device, according to an embodiment. FIG. 11C is a diagram of a user interface provided by an electronic device, according to an embodiment.

Referring to FIG. 11A and FIG. 3, if call reception is identified, the electronic device 1101 may display a first screen 1110 on the display 360 to indicate the call reception.

The electronic device 1101 may identify the temperature of the electronic device 1101, thereby identifying whether or not the actuator 350 can normally perform a receiver function. If it is identified that the actuator 350 cannot normally perform the receiver function, the electronic device 1101 may display a message 1130 on the display 360 to indicate execution of a "speakerphone mode" for conducting telephone speech regarding call reception by using the speaker 355. In addition, the electronic device 1101 may display a message 1130 on the display 360 to indicate that "the receiver function cannot be performed" in the current state. According to the user's input (telephone speech reception input), the electronic device 1101 may perform a telephone speech function regarding call reception by using the speaker 355.

Referring to FIG. 11B, the electronic device 1101 may identify the temperature of the electronic device 1101, thereby identifying whether or not the actuator 350 can normally perform the receiver function. If it is identified that the actuator 350 cannot normally perform the receiver function, the electronic device 1101 may display a message 1140 on the display 360 to request telephone speech reception standby. In addition, the electronic device 1101 may display a message 1140 on the display 360 to indicate that "the receiver cannot be operated" in the current state. If the receiver function is available in the current state, the electronic device 1101 may not display the message 1140 for requesting telephone speech reception standby. Thereafter, in response to the user's input (telephone speech reception input), the electronic device 1101 may perform a telephone speech function regarding call reception by using the actuator 350.

Referring to FIG. 11C, in response to call reception, the electronic device 1101 may display a second screen 1120 on the display 360 to indicate that the line is busy.

If the actuator (for example, actuator 350 in FIG. 3) cannot normally perform the receiver function, the electronic device 1101 may perform a telephone speech function regarding call reception by using the speaker 355. The electronic device 1101 may perform a telephone speech function in a speakerphone mode.

If the actuator 350 cannot normally perform the receiver function, the electronic device 1101 may perform a pre-aging operation with regard to the actuator 350. After the actuator 350 has performed the pre-aging operation, the electronic device 1101 may display a message 1150 on the display 360 to request switching from the speakerphone mode to a receiver mode in which a telephone speech function is performed through the receiver. In addition, the electronic device 1101 may display a message 1150 on the display 360 to indicate that "the receiver can be operated". Thereafter, the electronic device 1101 may output a voice output through the speaker 355 through the actuator 350.

Figure 12:
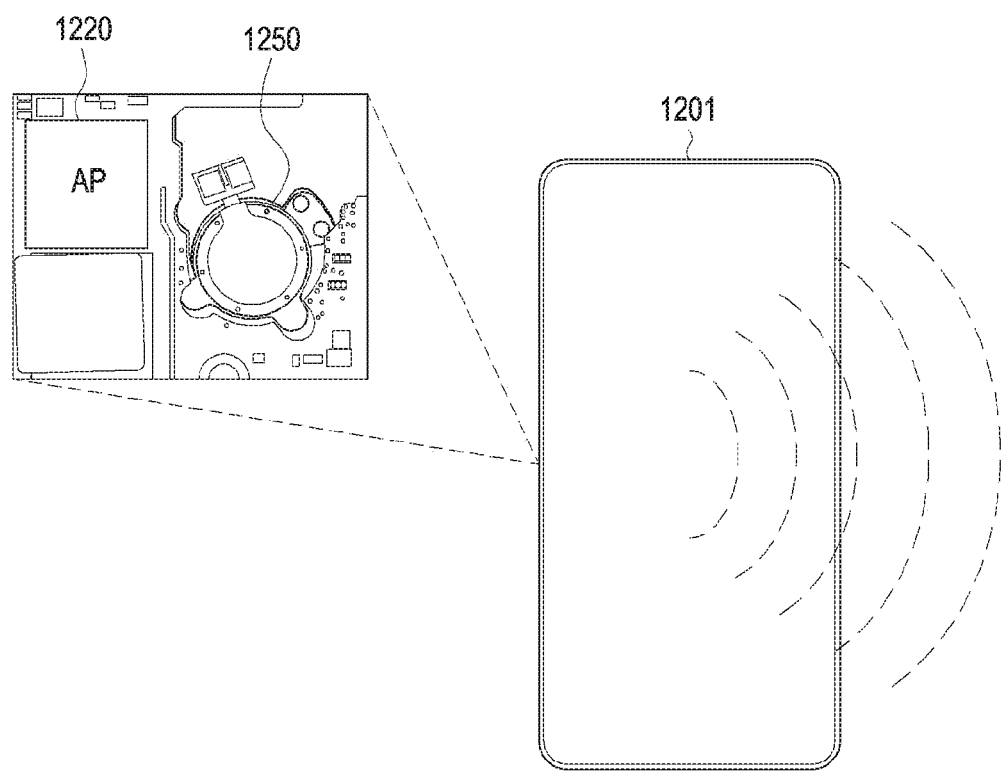
FIG. 12 is a diagram of an arrangement of an actuator included in an electronic device, according to an embodiment.

FIG. 12 is a diagram of an arrangement of an actuator included in an electronic device, according to an embodiment.

Referring to FIG. 12 and FIG. 3, the electronic device 1201 may cause the actuator 1250 to output at least one of a sound and a vibration by using the display as a vibrating plate. By using the actuator 1250, the electronic device 1201 may have no separate receiving portion on the front portion of the display to perform a receiver function.

The actuator 1250 may be disposed in an area (e.g., peripheral area of AP 1220) adjacent to the AP 1220. The actuator 1250 may be disposed in a position close to the AP 1220 (for example, position within 1 cm therefrom) such that the temperature measurement accuracy of the AP 1220 is improved, and such that heat generated when the AP 1220 is driven and/or latent heat of the AP 1220 can be delivered to the actuator 1250. The actuator 1250, disposed in a position close to the AP 1220, may escape from a low-temperature state (for example, a sub-zero state). That is, the actuator 1250, which is positioned at a short distance from the AP 1220, may avoid a state in which the same cannot perform the receiver function.

Meanwhile, the state in which the AP 1220 and the actuator 1250 are disposed in FIG. 12 is only an example for description, and the technical idea of the disclosure may not be limited thereto. The AP 1220 and the actuator 1250 may be disposed as close to each other as possible within a possible range.

According to an embodiment, an electronic device may include a display, an actuator configured to output at least one of a sound and a vibration by using the display, and a processor. The processor may be configured to identify whether or not the display is activated, identify the temperature of the electronic device if the display is activated, and control the actuator to generate at least one of a sound and a vibration at a designated frequency if the temperature is lower than a designated temperature.

The processor may be configured to control the actuator to generate at least one of the sound and the vibration for a designated time.

The processor may be configured to control the actuator to output at least one of a sound and a vibration at a frequency other than an audible frequency if the temperature is lower than the designated temperature.

The processor may be configured to control the actuator to output at least one of the sound and the vibration at the frequency other than the audible frequency for a designated time.

The processor may be configured to stop outputting at least one of the sound and the vibration at the designated frequency if a different command requesting at least one of a sound and a vibration of the actuator is identified while the vibration is generated, and control the actuator to generate at least one of a sound and a vibration corresponding to the different command.

The processor may be configured to control the actuator such that the vibration having the designated frequency is not generated if the actuator vibrates in response to call reception by the electronic device.

The processor may be configured to identify the temperature of the electronic device if the electronic device receives a call, and output a voice regarding the call by using a speaker of the electronic device if the temperature is lower than the designated temperature.

The actuator may be configured to generate at least one of the sound and the vibration at the designated frequency without control of the processor if the temperature of the actuator is lower than a designated temperature.

The actuator may be configured to perform a telephone speech receiver function.

According to an embodiment. a method for operating an electronic device may include identifying whether or not a display included in the electronic device is activated, identifying the temperature of the electronic device if the display is activated, and controlling an actuator included in the electronic device to generate at least one of a sound and a vibration at a designated frequency if the temperature is lower than a designated temperature. The actuator may be configured to output at least one of the sound and the vibration by using the display as a vibrating plate.

The step of controlling an actuator may include controlling the actuator to generate at least one of the sound and the vibration for a designated time.

The method may further include controlling the actuator to output at least one of a sound and a vibration having a frequency other than an audible frequency if the temperature is lower than the designated temperature.

The step of controlling an actuator may further include controlling the actuator to output at least one of the sound and the vibration at the frequency other than the audible frequency for a designated time.

The method may further stopping outputting at least one of the sound and the vibration at the designated frequency if a different command requesting at least one of a sound and a vibration of the actuator is identified while at least one of the sound and the vibration is generated, and controlling the actuator to generate at least one of a sound and a vibration corresponding to the different command.

The method may further controlling the actuator such that the vibration having the designated frequency is not generated if the actuator vibrates in response to call reception by the electronic device.

The method may further include identifying the temperature of the electronic device if the electronic device receives a call, and outputting a voice regarding the call by using a speaker of the electronic device, if the temperature is lower than the designated temperature.

The method may further include generating, by the actuator, at least one of the sound and the vibration at the designated frequency without control of the processor if the temperature of the actuator is lower than a designated temperature.

According to an embodiment, an electronic device may include a display, an actuator configured to output at least one of a sound and a vibration by using the display, and a processor. The processor may be configured to identify the temperature of the electronic device, and control the actuator to generate at least one of a sound and a vibration at a designated frequency if the temperature is lower than a designated temperature.

The actuator may be configured to perform a telephone speech receiver function.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an ASIC.

Various embodiments of the present disclosure may be implemented by software including an instruction stored in a machine-readable storage media readable by a machine (e.g., a computer). The machine may be a device that calls the instruction from the machine-readable storage media and operates depending on the called instruction and may include the electronic device. When the instruction is executed by the processor, the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

A method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. An electronic device comprising:
    a display;
    an actuator configured to output at least one of a sound and a vibration by using the display; and
    a processor configured to:
    identify whether the display is activated;
    identify a temperature of the electronic device if the display is activated; and
    control the actuator to generate at least one of a sound and a vibration at a designated frequency if the temperature is lower than a designated temperature.

2. The electronic device of claim 1, wherein the processor is further configured to control the actuator to generate at least one of the sound and the vibration for a designated time.

3. The electronic device of claim 1, wherein the processor is further configured to control the actuator to output at least one of a sound and a vibration at a frequency other than an audible frequency if the temperature is lower than the designated temperature.

4. The electronic device of claim 3, wherein the processor is further configured to control the actuator to output at least one of the sound and the vibration at the frequency other than the audible frequency for a designated time.

5. The electronic device of claim 1, wherein the processor is further configured to:
    stop outputting at least one of the sound and the vibration at the designated frequency if a different command requesting at least one of a sound and a vibration of the actuator is identified while the vibration is generated; and
    control the actuator to generate at least one of a sound and a vibration corresponding to the different command.

6. The electronic device of claim 1, wherein the processor is further configured to control the actuator such that the vibration having the designated frequency is not generated if the actuator vibrates in response to call reception by the electronic device.

7. The electronic device of claim 1, wherein the processor is further configured to:
    identify the temperature of the electronic device if the electronic device receives a call; and
    output a voice regarding the call by using a speaker of the electronic device if the temperature is lower than the designated temperature.

8. The electronic device of claim 1, wherein the actuator is further configured to generate at least one of the sound and the vibration at the designated frequency without control from the processor if the temperature of the actuator is lower than a designated temperature.

9. The electronic device of claim 1, wherein the actuator is further configured to perform a telephone speech receiver function.

10. A method for operating an electronic device, the method comprising:
    identifying whether a display included in the electronic device is activated;
    identifying a temperature of the electronic device if the display is activated; and
    controlling an actuator included in the electronic device to generate at least one of a sound and a vibration at a designated frequency if the temperature is lower than a designated temperature,
    wherein the actuator is configured to output at least one of the sound and the vibration by using the display as a vibrating plate.

11. The method of claim 10, further comprising controlling the actuator to generate at least one of the sound and the vibration for a designated time.

12. The method of claim 10, further comprising controlling the actuator to output at least one of the sound and the vibration at a frequency other than an audible frequency if the temperature is lower than the designated temperature.

13. The method of claim 12, further comprising controlling the actuator to output at least one of the sound and the vibration at the frequency other than the audible frequency for a designated time.

14. The method of claim 10, further comprising:
    stopping outputting at least one of the sound and the vibration at the designated frequency if a different command requesting at least one of a sound and a vibration of the actuator is identified while at least one of the sound and the vibration is generated; and
    controlling the actuator to generate at least one of a sound and a vibration corresponding to the different command.

15. The method of claim 10, further comprising controlling the actuator such that the vibration having the designated frequency is not generated if the actuator vibrates in response to call reception by the electronic device.

16. The method of claim 10, further comprising:
    identifying the temperature of the electronic device if the electronic device receives a call; and outputting a voice regarding the call by using a speaker of the electronic device if the temperature is lower than the designated temperature.

17. The method of claim 10, further comprising generating, by the actuator, at least one of the sound and the vibration at the designated frequency without control from the processor if the temperature of the actuator is lower than a designated temperature.

18. The method of claim 10, wherein the actuator is configured to perform a telephone speech receiver function.

19. An electronic device comprising:
a display;
an actuator configured to output at least one of a sound and a vibration by using the display; and
a processor, configured to:
identify a temperature of the electronic device; and
control the actuator to generate at least one of a sound and a vibration at a designated frequency if the temperature is lower than a designated temperature.

20. The electronic device of claim 19, wherein the actuator is configured to perform a telephone speech receiver function.

* * * * *